US008731182B2

(12) United States Patent
Foster et al.

(10) Patent No.: US 8,731,182 B2
(45) Date of Patent: May 20, 2014

(54) DATA STORE FOR ASSESSING ACCURACY OF CALL CENTER AGENT SERVICE TIME ESTIMATES

(75) Inventors: Robin H. Foster, Little Silver, NJ (US); Hongguang Li, Broomfield, CO (US); Lynn R. Smith, Westminster, CO (US); Katherine A. Sobus, Wilmington, DE (US)

(73) Assignee: Avaya Inc., Basking Ridge, NJ (US)

( * ) Notice: Subject to any disclaimer, the term of this patent is extended or adjusted under 35 U.S.C. 154(b) by 1182 days.

(21) Appl. No.: 12/544,666

(22) Filed: Aug. 20, 2009

(65) Prior Publication Data

US 2010/0322408 A1 Dec. 23, 2010

Related U.S. Application Data

(63) Continuation-in-part of application No. 12/490,238, filed on Jun. 23, 2009.

(51) Int. Cl.
*H04M 3/00* (2006.01)

(52) U.S. Cl.
USPC .............................. 379/266.06; 379/266.01

(58) Field of Classification Search
USPC ........ 379/265.01–265.14, 266.01–266.1, 309
See application file for complete search history.

(56) References Cited

U.S. PATENT DOCUMENTS

| | | | | |
|---|---|---|---|---|
| 5,854,832 | A * | 12/1998 | Dezonno | 379/265.07 |
| 6,463,346 | B1 * | 10/2002 | Flockhart et al. | 700/102 |
| 6,714,643 | B1 * | 3/2004 | Gargeya et al. | 379/266.06 |
| 6,804,346 | B1 * | 10/2004 | Mewhinney | 379/265.1 |
| 7,123,709 | B1 * | 10/2006 | Montgomery et al. | 379/221.08 |
| 8,117,064 | B2 * | 2/2012 | Bourne et al. | 705/7.38 |
| 2002/0141561 | A1 * | 10/2002 | Duncan et al. | 379/220.01 |
| 2003/0195753 | A1 * | 10/2003 | Homuth | 705/1 |
| 2005/0069119 | A1 * | 3/2005 | Erhart et al. | 379/215.01 |
| 2006/0165050 | A1 * | 7/2006 | Erhart et al. | 370/351 |
| 2006/0182259 | A1 | 8/2006 | Shaffer et al. | |

* cited by examiner

*Primary Examiner* — William Deane, Jr.
(74) *Attorney, Agent, or Firm* — John Maldjian, Esq.; Alexander D. Walter, Esq.; Kacvinsky Daisk Bluni PLLC

(57) ABSTRACT

A data store (e.g., a relational database, an object-oriented database, an unstructured file system, an in-memory data structure, etc.) and associated methods are disclosed for predicting the accuracy of agent responses in a call center. In accordance with the illustrative embodiment, agents in a call center are prompted at different times during their workday for estimates of how much longer they will be servicing their current call, and the estimates are stored in the data store along with the actual times required for completion of the call. Statistics for each agent's prediction accuracy are computed and stored in the data store along with the raw data, and can then be used to assess the accuracy of subsequent agent responses to queries.

16 Claims, 6 Drawing Sheets

Figure 3

CALL TABLE 200

| Call | Agent | Caller | Stage | Capabilities | Transactions | Estimate | Time of Estimate | Actual Remaining | Delta | Transfer Info | # Holds | Hold Times | End Time |
|---|---|---|---|---|---|---|---|---|---|---|---|---|---|
| 301 | 302 | 303 | 304 | 305 | 306 | 307 | 308 | 309 | 310 | 311 | 312 | 313 | 314 |
| ... | ... | ... | ... | ... | ... | ... | ... | ... | ... | ... | ... | ... | ... |

AGENT ACCURACY TABLE 210

| Agent | Mean of Differences | Std Dev of Differences | Other Accuracy Measure(s) (e.g., maximum difference, etc.) |
|---|---|---|---|
| 321 | 322 | 323 | 324 |
| ... | ... | ... | ... |

DATA STORE FOR ASSESSING ACCURACY OF CALL CENTER AGENT SERVICE TIME ESTIMATES

CROSS-REFERENCE TO RELATED APPLICATION

The present invention is a continuation-in-part of U.S. patent application Ser. No. 12/490,238, filed 23 Jun. 2009 (now pending), entitled "Servicing Calls in Call Centers Based On Estimated Call Value", which is incorporated by reference.

FIELD OF THE INVENTION

The present invention relates to call centers in general, and, more particularly, to a data store for predicting agent response accuracy.

BACKGROUND OF THE INVENTION

A call center is a facility where telephone calls are handled by human operators known as agents, usually with some amount of computer automation. Typically, a call center has the ability to handle a considerable volume of calls, providing functions such as routing calls to agents, logging calls, recording calls, and so forth. Call centers are used by many mail-order catalog organizations, telemarketing companies, computer product help desks, government agencies, and large enterprises.

Typically, when a call is received at a call center, the call is automatically routed to an agent who is not currently engaged in a conversation with another caller. If all agents are busy, typically the call is inserted into a queue and the caller is placed "on hold." Callers on hold are typically played a message such as the following: "All agents are currently assisting other customers. Please stay on the line and the next available agent will take your call. Calls are answered in the order that they are received".

SUMMARY OF THE INVENTION

The present invention comprises a data store (e.g., a relational database, an object-oriented database, an unstructured file system, an in-memory data structure, etc.) and associated methods for predicting the accuracy of agent responses in a call center. In particular, in accordance with the illustrative embodiment, agents in a call center are prompted at different times during their workday for estimates of how much longer they will be servicing their current call, and the estimates are stored in the data store along with the actual times required for completion of the call. Statistics for each agent's prediction accuracy are computed and stored in the data store along with the raw data, and can then be used to assess the accuracy of subsequent agent responses to queries. In accordance with the illustrative embodiment, for example, the data store is used to assess the accuracy of subsequent agent estimates of remaining service times, and these assessments are used in determining how high-value incoming calls are routed to agents in the call center.

The illustrative embodiment comprises a data store comprising: a first value that is based on an estimate of how much longer an agent of a call center will be serving a call, wherein the estimate is provided by the agent during the call; and a second value that is based on the actual remaining time required for the agent to service the call.

BRIEF DESCRIPTION OF THE DRAWINGS

FIG. 3 depicts a data schema for call table 200 and agent accuracy table 210, as shown in FIG. 2, in accordance with the illustrative embodiment of the present invention.

DETAILED DESCRIPTION

For the purposes of this specification, a "call" is defined to encompass all types of communications including a traditional voice telephone call, a videophone call, an email message, a text-based instant message, etc.

Figure 1:
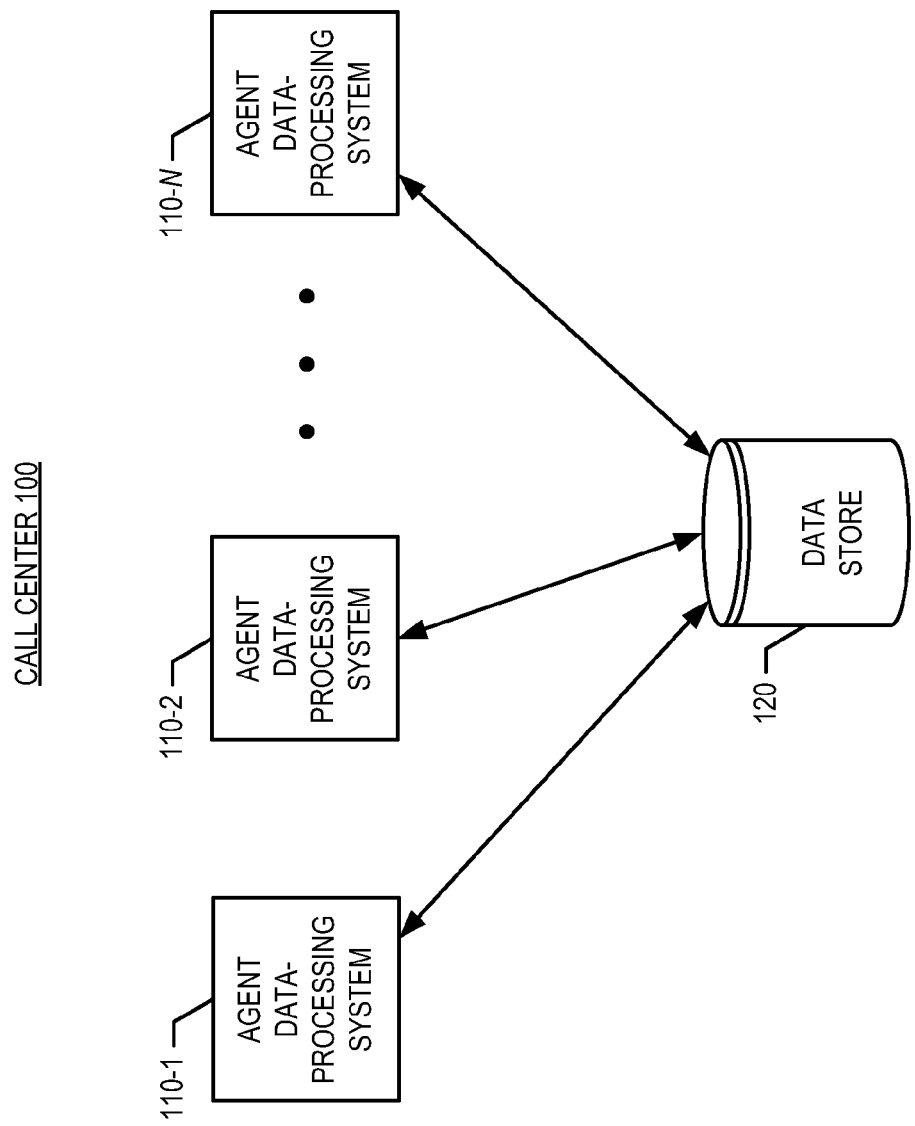
FIG. 1 depicts the salient elements of a call center, in accordance with the illustrative embodiment of the present invention.

FIG. 1 depicts the salient elements of call center 100, in accordance with the illustrative embodiment of the present invention. As shown in FIG. 1, call center 100 comprises agent data-processing systems 110-1 through 110-N, where N is a positive integer, and data store 120.

Each data-processing system 110-$i$, where i is an integer between 1 and N inclusive, is one of a personal computer, notebook computer, smartphone, etc. that is associated with a respective agent in call center 100. In accordance with the illustrative embodiment, each data-processing system 110-$i$ is capable of generating and directing output to an agent (e.g., a message prompting an agent for information during a call, etc.), of receiving input from an agent, of storing information in data store 120, and of retrieving information from data store 120 (e.g., via the submission of queries, etc.). As will be appreciated by those skilled in the art, in some embodiments of the present invention data-processing system 110-$i$ might also be capable of performing other tasks, such as monitoring the performance of an agent during calls, executing one or more software applications that might be used by an agent (e.g., an order-entry application, an inventory application, etc.), and so forth.

Data store 120 comprises memory (e.g., disk-based storage, random-access memory, flash memory, etc.) that is capable of storing information concerning calls to call center 100, and concerning agents' estimates of call service times, as described in detail below and with respect to FIGS. 2 and 3. In accordance with the illustrative embodiment, data store 120 is a relational database; however, it will be clear to those skilled in the art, after reading this disclosure, how to make and use other types of embodiments of data store 120 (e.g., an object-oriented database, an unstructured file system, an in-memory data structure, etc.).

The Data Store

Figure 2:
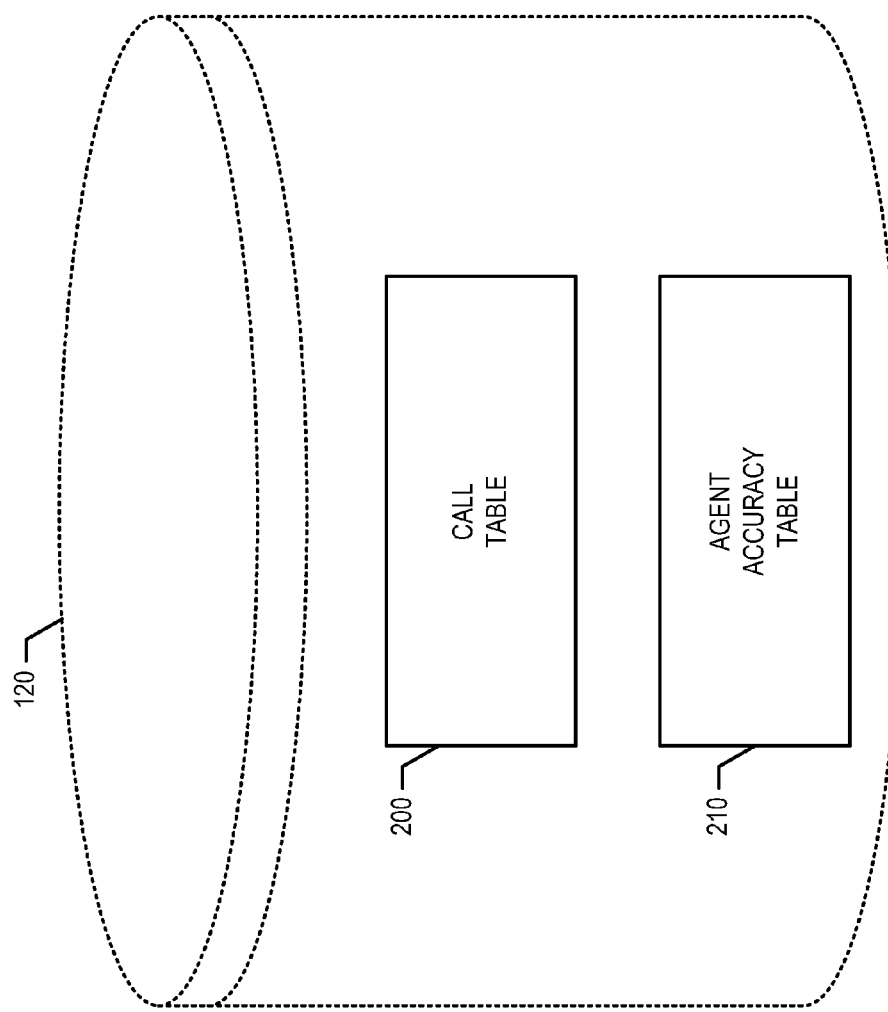
FIG. 2 depicts the contents of data store 120, as shown in FIG. 1, in accordance with the illustrative embodiment of the present invention.

FIG. 2 depicts the contents of data store 120, in accordance with the illustrative embodiment of the present invention. As shown in FIG. 2, data store 120 comprises call table 200 and agent accuracy table 210, the organization and contents of which are described in detail below and with respect to FIG. 3.

FIG. 3 depicts a data schema for call table 200 and agent accuracy table 210, in accordance with the illustrative embodiment of the present invention. Each row in call table 200 corresponds to a call to call center 100, and each row in agent accuracy table 210 corresponds to an agent of call center 100. As shown in FIG. 3, table 200 comprises columns 301 through 309, and table 210 comprises columns 321 through 324.

Column 301 stores an indicium of a call (e.g., a call serial number, etc.) and serves as a key of call table 200.

Column 302 stores an indicium of the agent that serviced the call (e.g., an agent identification number, etc.).

Column 303 stores an indicium of the caller (e.g., a customer identification number, the phone number of the caller, etc.).

Column 304 stores an indication of which work stage the call was in (e.g., opening salutation stage, order placement, order confirmation, etc.) when the agent provides an estimate of how much longer the agent will be servicing the call (i.e., the remaining service time for the call).

Column 305 stores an indication of one or more capabilities required by the agent to service the call (e.g., the ability to authorize refunds, the ability to access a particular software application, etc.). In accordance with the illustrative embodiment, an entry of column 305 might be empty, indicating that no special capabilities were required for the call.

Column 306 stores an indicium of one or more transactions that occurred during the call (e.g., a purchase order, etc.). In accordance with the illustrative embodiment, an entry of column 305 might be empty, indicating that no transactions occurred during the call.

Column 307 stores an estimate, provided by the agent, of the remaining service time for the call. In accordance with the illustrative embodiment, an estimate might be a single value, or might be a range (e.g., a minimum-maximum range, a 90% confidence interval, etc.).

Column 308 stores the time at which the agent provided the estimate of column 307.

Column 309 stores the actual remaining service time for the call (i.e., how much time was actually required for the agent to complete servicing of the call, measured from the time that the agent provided his or her estimate).

Column 310 stores the difference between the actual and estimated remaining service times for the call. As will be appreciated by those skilled in the art, in some embodiments of the present invention, when the estimate is a range, the difference might be a single value (e.g., the difference between the actual time and the midpoint of the estimated range, etc.), while in some other embodiments, the difference might also be represented by a range.

Column 311 stores information about any transfer(s) during the call (e.g., the time at which a transfer was made, the agent to whom the call was transferred, etc.).

Column 312 stores the number of times, if any, that the caller was placed on hold during the call.

Column 313 stores how long the caller was on hold during the call. As will be appreciated by those skilled in the art, in some embodiments, column 312 might store a single value that indicates that the total time that the caller was on hold, while in some other embodiments, column 313 might store a plurality of values for each time the caller was placed on hold.

Column 314 stores the of time at which the call ends.

Column 321 stores an indicium of an agent of call center 100 (e.g., an agent identification number, etc.) and serves as a key of agent accuracy table 210.

Column 322 stores the mean of the actual-versus-estimated time differences for each agent (i.e., the mean of the entries of column 309 for each particular agent).

Column 323 stores the standard deviation of the actual-versus-estimated time differences for each agent.

Column 324 stores one or more additional accuracy measures for each agent (e.g., the maximum actual-versus-estimated time difference, a high-order moment of the time differences, etc.).

As will be appreciated by those skilled in the art, some other embodiments of the present invention might omit one or more data of the illustrative embodiment, or might store other data in addition to those of the illustrative embodiment, and it will be clear to those skilled in the art, after reading this disclosure, how to make and use such embodiments. As will further be appreciated by those skilled in the art, some other embodiments of the present invention might employ an alternative schema for storing and organizing information in data store 120, and it will be clear to those skilled in the art, after reading this disclosure, how to make and use such embodiments.

Building the Data Store

Figure 4:
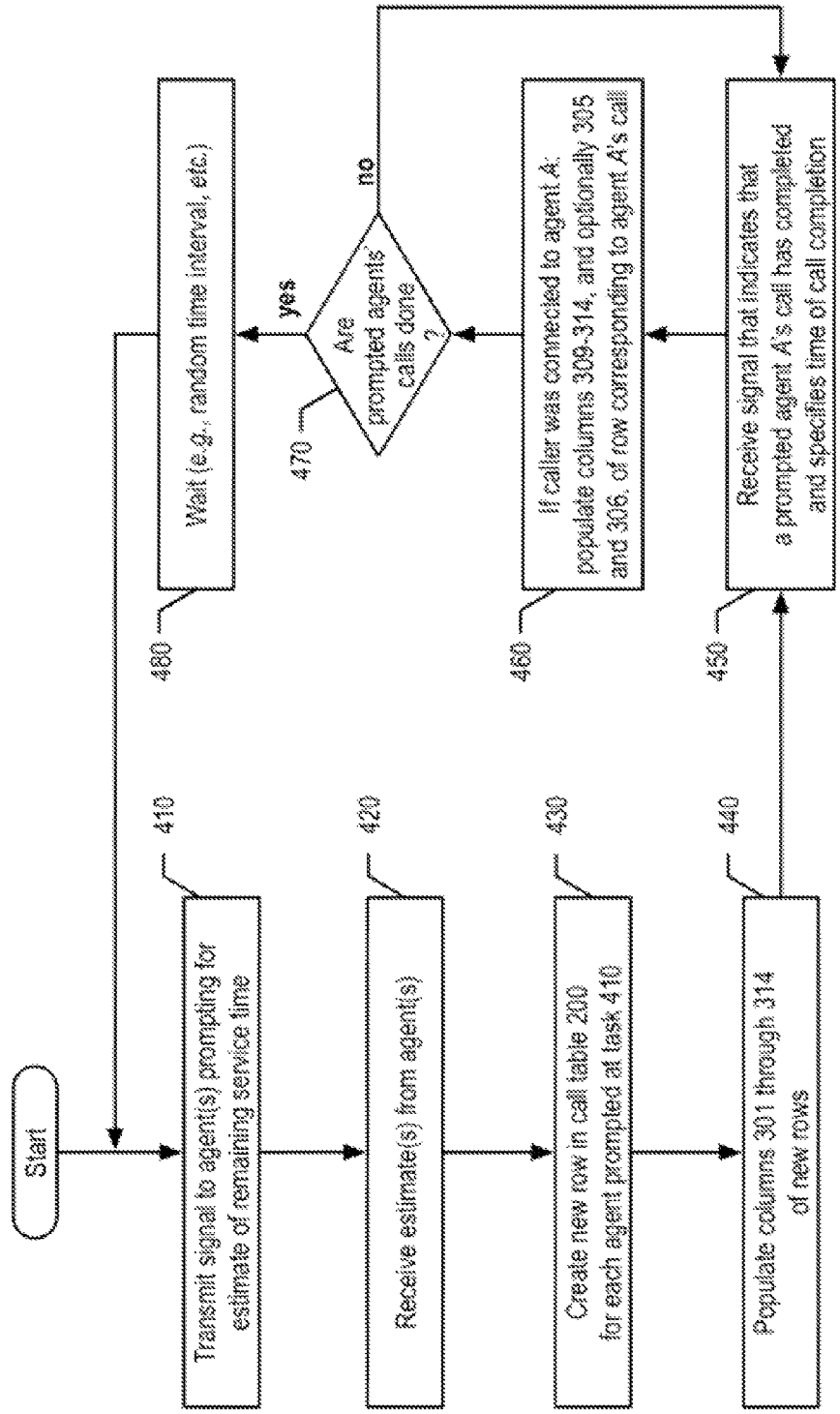
FIG. 4 depicts a flowchart of the salient tasks of a method for obtaining and storing information in call table 200, in accordance with the illustrative embodiment of the present invention.

FIG. 4 depicts a flowchart of the salient tasks of a method for obtaining and storing information in call table 200, in accordance with the illustrative embodiment of the present invention. In accordance with the illustrative embodiment of the present invention, the tasks of the method of FIG. 4 are performed by a data-processing system of call center 100 not depicted in FIG. 1 (e.g., a server, a router, etc.). As will be appreciated by those skilled in the art, in some embodiments of the present invention, this data-processing system might also handle other functions of call center 100 (e.g., queue management, application logic, interactive voice response [IVR] system functions, etc.), while in some other embodiments of the present invention, this data-processing system might be dedicated to performing the tasks of the method of FIG. 4. Moreover, it will be clear to those skilled in the art, after reading this disclosure, which tasks depicted in FIG. 4 can be performed simultaneously or in a different order than that depicted.

At task 410, a signal is transmitted to one or more agents of call center 100 that prompts the agent for an estimate of how much longer the agent will be serving his or her current call. As will be appreciated by those skilled in the art, in some embodiments of the present invention, the prompting signal might be transmitted to all of the agents of call center 100 every time task 410 is executed in the loop of FIG. 4, while in some other embodiments, the agents of call center 100 might be "cycled through," one at a time, at each iteration of the loop, while in still some other embodiments, one or more agents of call center 100 might be selected at random at each iteration of the loop, while in yet other embodiments, some other scheme might be employed for determining to which agent(s) the prompting signal is transmitted.

In accordance with the illustrative embodiment, the prompt is conveyed to an agent via a video display terminal; however, as will be appreciated by those skilled in the art, in some other embodiments of the present invention, the prompt might be conveyed to an agent in some other manner (e.g., via audio output to a wireless headset, via audio output to a speaker connected to a data-processing system, etc.). As will further be appreciated by those skilled in the art, in some embodiments of the present invention the prompt might enable an agent to provide a range (e.g., a minimum-maximum range, a 90% confidence interval, etc.), while in some other embodiments of the present invention, the prompt might allow the agent to specify only a single value.

At task 420, estimates are received from the agents, in well-known fashion. As will be appreciated by those skilled in the art, in some embodiments of the present invention the agents might specify their responses via a graphical user interface of a data-processing system, while in some other embodiments of the present invention, the agents might specify their responses in some other fashion (e.g., via a microphone connected to a data-processing system, etc.)

At task 430, a new row is created in call table 200 for each agent prompted at task 410.

At task 440, columns 301 through 314 are populated accordingly for each of the new rows created in task 430. As will be appreciated by those skilled in the art, the information required to populate columns 305 and 306 might come from a variety of sources, such as a transaction server, a call queue management server, and so forth.

At task 450, a signal is received that indicates that a prompted agent A has completed servicing his or her current call, and specifies the time at which the call was completed.

At task 460, if the caller was in fact connected to agent A, columns 305 and 306 and columns 309 through 314 of the row corresponding to agent A's call are populated accordingly. As will be appreciated by those skilled in the art, the contents of columns 305 and 306 might be populated or updated based on information from a transaction server, a call queue management server, etc. (for example, a transaction might have been initiated during a call after the agent provided the estimate, in which case the contents of column 306 would be updated accordingly).

Task 470 checks whether all of the prompted agents' calls have been completed. If so, execution proceeds to task 480, otherwise execution continues back at task 450.

Task 480 waits for a time interval. As will be appreciated by those skilled in the art, in some embodiments of the present invention the length of this time interval might be determined randomly each time task 480 is executed, while in some other embodiments, the waiting time interval might always be the same pre-determined length, while in still some other embodiments, the length of the waiting time might be determined in some other fashion. After task 480, the method of FIG. 4 continues back at task 410.

Figure 5:
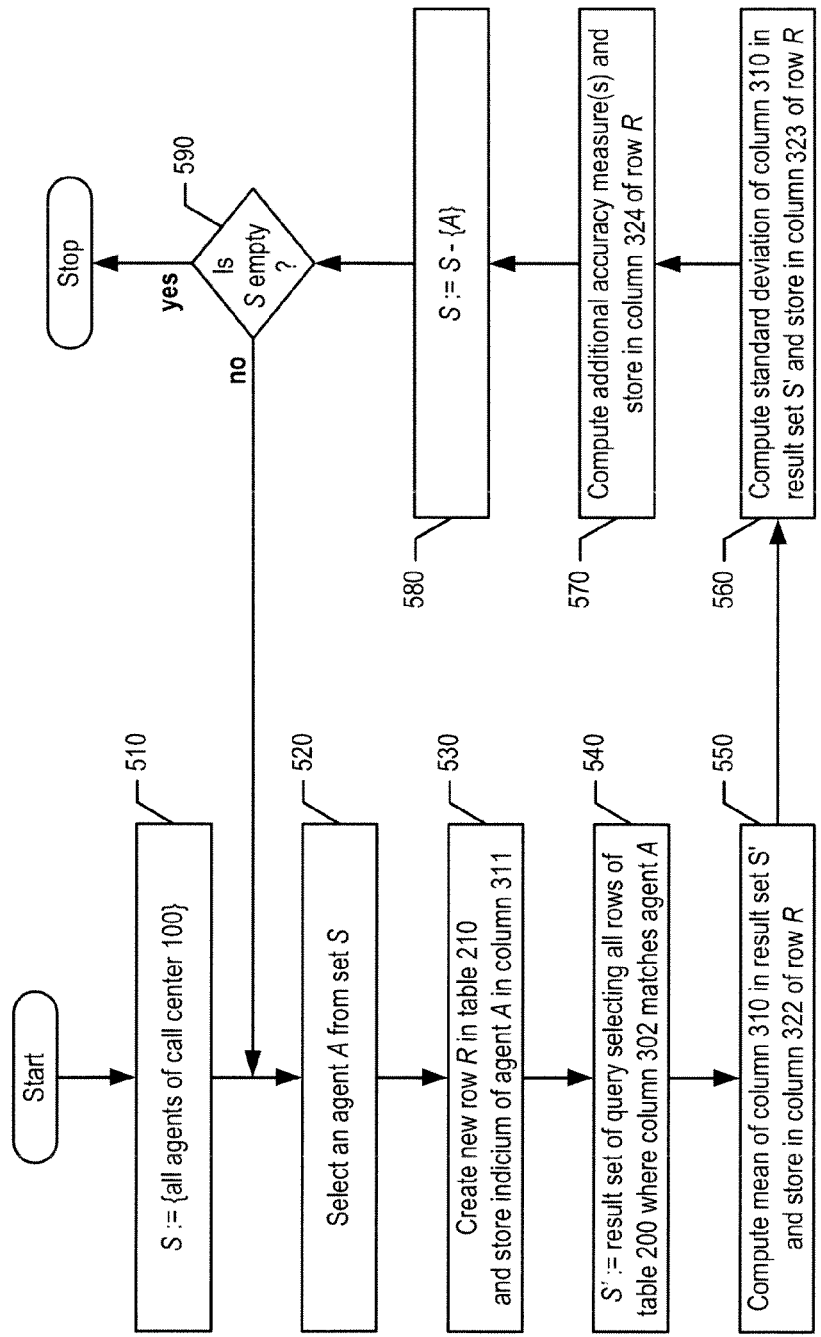
FIG. 5 depicts a flowchart of the salient tasks of a method for computing and storing information in accuracy table 210, in accordance with the illustrative embodiment of the present invention.

FIG. 5 depicts a flowchart of the salient tasks of a method for computing and storing information in accuracy table 210, in accordance with the illustrative embodiment of the present invention. In accordance with the illustrative embodiment of the present invention, the tasks of the method of FIG. 5 are performed by a data-processing system of call center 100 not depicted in FIG. 1 (e.g., a server, a router, etc.). As will be appreciated by those skilled in the art, in some embodiments of the present invention, this data-processing system might also handle other functions (e.g., the method of FIG. 4, queue management, application logic, interactive voice response [IVR] system functions, etc.), while in some other embodiments of the present invention, this data-processing system might be dedicated to performing the tasks of the method of FIG. 5. Moreover, it will be clear to those skilled in the art, after reading this disclosure, which tasks depicted in FIG. 5 can be performed simultaneously or in a different order than that depicted.

At task 510, variable S is initialized to the set of all agents of call center 100.

At task 520, variable A is set to an agent of set S. As will be appreciated by those skilled in the art, in some embodiments an agent of set S might be selected randomly, while in some other embodiments an agent might be selected in some other fashion (e.g., selecting the agent of set S with the smallest agent identification number, etc.).

At task 530, a new row R is created in agent accuracy table 210, and an indicium of agent A is stored in column 321 of row R.

At task 540, a query is executed that selects all rows of call table 200 for which column 302 matches agent A, and the result set of the query is stored in variable S'.

At task 550, the mean of the values of column 310 in result set S' is computed and stored in column 322 of row R.

At task 560, the standard deviation of the values of column 310 in result set S' is computed and stored in column 323 of row R.

At task 570, one or more additional accuracy measures (e.g., maximum difference, a high-order moment, etc.) are computed based on the values of column 310 in result set S', and are stored in column 324 of row R.

At task 580, A is removed from set S.

Task 590 checks whether set S is empty. If not, execution continues back at task 520, otherwise the method of FIG. 5 terminates.

Using the Data Store to Predict Accuracy of Agent Responses

Once data store 120 has been built, it can be used to predict the accuracy of agent responses. In particular, in accordance with the illustrative embodiment, data store 120 is used to predict the accuracy of agent responses in the handling of calls at call center 100, as described below and with respect to FIG. 6.

Figure 6:
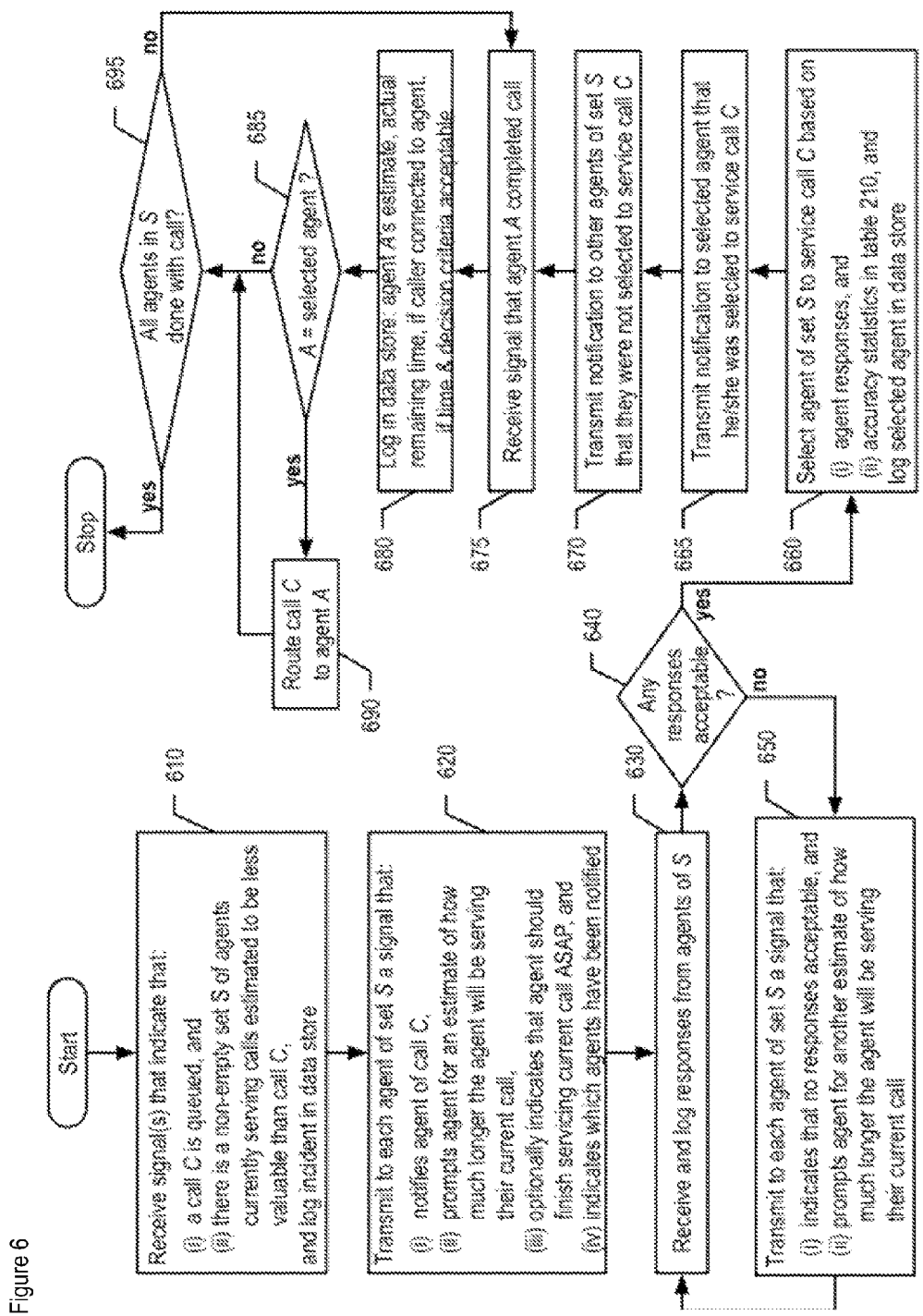
FIG. 6 depicts a flowchart of the salient tasks of a method of handling calls at call center 100, as shown in FIG. 1, in accordance with the illustrative embodiment of the present invention.

FIG. 6 depicts a flowchart of the salient tasks of a method of handling calls at call center 100, in accordance with the illustrative embodiment of the present invention. In accordance with the illustrative embodiment of the present invention, the tasks of the method of FIG. 6 are performed by a data-processing system of call center 100 not depicted in FIG. 1 (e.g., a server, a router, etc.). As will be appreciated by those skilled in the art, in some embodiments of the present invention, this data-processing system might also handle other functions of call center 100 (e.g., queue management, application logic, interactive voice response [IVR] system functions, etc.), while in some other embodiments of the present invention, this data-processing system might be dedicated to performing the tasks of the method of FIG. 6. Moreover, it will be clear to those skilled in the art, after reading this disclosure, which tasks depicted in FIG. 6 can be performed simultaneously or in a different order than that depicted.

At task 610, one or more signals are received that indicate that: (i) a call C to call center 100 is queued for service, and (ii) there is a non-empty set S of agents who are currently serving calls that are estimated to be less valuable than call C; and the incident is stored in data store 120. As will be appreciated by those skilled in the art, the value of a queued call might be estimated in a variety of ways (e.g., based on the identity of the caller, etc.); similarly, the value of a call that is currently being serviced might be estimated in a variety of ways (e.g., based on the identity of the caller, based on the dollar amount of merchandise already ordered during the call, etc.) As will further be appreciated by those skilled in the art, in some embodiments of the present invention, the data-processing system performing the tasks of FIG. 6 might be responsible for estimating the value of queued calls and currently-served calls, while in some other embodiments of the present invention, one or more other data-processing systems of call center 100 not depicted in FIG. 1 (e.g., a queue management server, a billing application server, etc.) might handle these functions.

At task 620, a signal is transmitted to each of the agents of set S that:
- (i) notifies the agent of call C,
- (ii) prompts the agent for an estimate of how much longer the agent will be serving his or her current call,
- (iii) optionally indicates that the agent should finish servicing his or her current call as quickly as possible, and
- (iv) indicates which agents have been notified.

In accordance with the illustrative embodiment, the notification, prompt, and indication are conveyed to the agent via a video display terminal (e.g., a "dumb" terminal, a monitor connected to a data-processing system, etc.). As will be appreciated by those skilled in the art, in some other embodiments of the present invention, some or all of the notification, prompt, and indication might be conveyed to the agent in some other manner (e.g., via audio output to a wireless headset, via audio output to a speaker connected to a data-processing system, etc.).

As will further be appreciated by those skilled in the art, for embodiments in which the indication (i.e., option (iii)) is omitted, the notification and prompt might implicitly have the effect of encouraging the agent to wrap up his or her current call as quickly as possible. As will yet further be appreciated by those skilled in the art, in some embodiments of the present invention the prompt might enable an agent to provide a range (e.g., a minimum-maximum range, a 90% confidence interval, etc.), or might enable an agent to decline servicing call C (in which case the agent is removed from consideration as a potential candidate to service call C.)

At task 630, responses from the agents of set S are received and logged in data store 120, in well-known fashion. As will be appreciated by those skilled in the art, in some embodiments of the present invention the agents might specify their responses via a graphical user interface of a data-processing system, while in some other embodiments of the present invention, the agents might specify their responses in some other fashion (e.g., via a microphone connected to a data-processing system, etc.)

Task 640 branches based on whether at least one of the responses received at task 630 is acceptable (e.g., whether there is a response that specifies a maximum waiting time below a given threshold, etc.). If so, execution continues at task 660, otherwise execution proceeds to task 650.

At task 650, a signal is transmitted to each of the agents of set S that:
- (i) indicates that none of the agent responses were acceptable, and
- (ii) prompts the agent for another estimate of how much longer the agent will be serving his or her current call.

After task 650, execution continues back at task 630.

At task 660, one of the agents of set S is selected to service call C, based on:
- (i) the agent responses received at task 630, and
- (ii) the accuracy statistics stored in table 210 of data store 120 for each of the agents of set S;

and the selected agent is logged in data store 120. As will be appreciated by those skilled in the art, the accuracy statistics in table 210 might be used in a variety of ways at task 660; for example, in some embodiments of the present invention, an agent's response might be increased or decreased in accordance with the mean difference (i.e., column 322) stored in table 210, while in some other embodiments of the present invention, an agent's response might be adjusted based on a combination of the accuracy measures of table 210. In still other embodiments of the present invention, an agent might be removed from consideration outright if the agent's historical errors exceed a particular threshold.

At task 665, a signal is transmitted to the selected agent that notifies the agent that he or she has been selected to service call C.

At task 670, a signal is transmitted to the agents of set S that were not selected; this signal notifies the agents that another agent will be servicing call C.

At task 675, a signal is received that indicates that an agent A of set S (either the selected agent or an agent who was not selected) has completed servicing his or her current call, and is now available.

At task 680, the following data are written to data store 120: the estimate provided by agent A, the actual remaining time of agent A's current call, whether the caller was connected to an agent, and whether the time and decision criteria were acceptable.

Task 685 branches based on whether agent A is the agent selected to service call C. If so, execution proceeds to task 690, otherwise execution continues at task 695.

At task 690, call C is routed to the selected agent A, in well-known fashion.

Task 695 branches based on whether all agents of set S have completed their calls. If not, execution continues back at task 675, otherwise the method of FIG. 6 terminates.

As will be appreciated by those skilled in the art, in some embodiments of the present invention it might be advantageous to adjust the timing and repetition of the loop of tasks 630 through 650 (i.e., pinging the agents and assessing their responses) so that agents are not overly "bombarded" and are given sufficient time to respond to prompts. As will further be appreciated by those skilled in the art, in some embodiments of the present invention it might be advantageous to change the threshold of what constitutes "acceptable" during subsequent iterations of this loop. For such embodiments, it will be clear to those skilled in the art, after reading this disclosure, how to modify the method of FIG. 6 accordingly.

As will further be appreciated by those skilled in the art, in some embodiments of the present invention, data store 120 might be used to predict the accuracy of agent responses in other tasks and contexts. For example, in some embodiments, agent response accuracy metrics for in data store 120 might be used in the establishment of agent schedules at call center 100. Alternatively, in some other embodiments of the present invention, agent response accuracy metrics in data store 120 might be used in tasks where agents are asked to predict other types of information, perhaps even unrelated to remaining service time. For example, some embodiments might use agent response accuracy metrics in data store 120 to assess an agent's ability to accurately predict a caller's degree of satisfaction with the agent's performance during a call (e.g., a "satisfaction score" from 1 to 10, etc.). As another example, some embodiments might use agent response accuracy metrics in data store 120 to assess a trouble-ticket agent's ability to accurately predict when he or she will get back to a customer (e.g., how long a technician will need to troubleshoot a problem before the customer can be called back with an answer, how long a claim clerk will need to look at something before the customer can be called back with appropriate advice, etc.).

As will yet further be appreciated by those skilled in the art, in some embodiments in which information unrelated to—or only partially related to—remaining service time is solicited from agents, data store 120 might explicitly store the agents' responses and associated information. For example, in embodiments in which data store 120 is used to assess an agent's ability to accurately predict a caller's satisfaction score, data store 120 might contain agent predictions and actual satisfaction scores for previous calls, as well as statistics based on these data (e.g., mean difference, maximum difference, etc.) as in the illustrative embodiment.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method comprising:
prompting a first agent of a call center, by a data processing system associated with the first agent, while said first agent is serving a first call, for an estimate of how much longer said first agent will be serving said first call;
receiving, by the data processing system, a first response from said first agent;
storing, by the data processing system, one or more values based on said first response in a data store;
prompting, by the data processing system, said first agent, while said first agent is serving a second call, for an estimate of how much longer said first agent will be serving said second call;
receiving, by the data processing system, a second response from said first agent;
storing, by the data processing system, one or more values based on said second response in said data store;
computing a measure of how closely a plurality of service time estimates provided by said agent compare to actual remaining service times; and
storing, by the data processing system, said measure in said data store.

2. The method of claim 1 wherein the times at which said first agent is prompted is determined at random.

3. The method of claim 1 wherein said first response specifies a range.

4. The method of claim 1 further comprising storing in said data store a value that is based on the actual remaining service time for said first call.

5. The method of claim 1 further comprising:
prompting a second agent of a call center, while said second agent is serving a third call, for an estimate of how much longer said second agent will be serving said third call;
receiving a third response from said second agent; and
storing one or more values based on said third response in said data store.

6. A system comprising:
a data processing system associated with an agent of a call center;
a data store coupled to the data processing system, wherein the data processing system is configured to access in the data store:
a first value that is based on an estimate of how much longer the agent of a call center will be serving a call, wherein said estimate is provided by said agent during said call;
a second value that is based on the actual remaining time required for said agent to service said call; and
a measure of accuracy computed over a plurality of service time estimates provided by said agent.

7. The system of claim 6 wherein said estimate specifies a range.

8. The system of claim 6 further comprising a third value that identifies which of a plurality of stages said call was in when said estimate was provided.

9. The system of claim 6 further comprising an indication of a capability required by said agent for said call.

10. The system of claim 6 further comprising an indicium of a transaction that resulted from said call.

11. A system comprising:
a data processing system associated with an agent of a call center;
a data store coupled to the data processing system, wherein the data processing system is configured to access in the data store:
(a) a first value that is based on the difference between:
(i) an estimate of how much longer an agent of a call center will be serving a first call, wherein said estimate is provided by said agent during said first call, and
(ii) the actual remaining time required for said agent to service said first call;
(b) a second value that is based on the difference between:
(i) an estimate of how much longer said agent will be serving a second call, wherein said estimate is provided by said agent during said second call, and
(ii) the actual remaining time required for said agent to service said second call; and
(c) a measure of accuracy computed over a plurality of service time estimates provided by said agent.

12. The system of claim 11 wherein said estimate specifies a range.

13. The system of claim 11 further comprising: (c) an indicium of the person who placed said first call.

14. A system comprising:
a data processing system associated with an agent of a call center;
a data store coupled to the data processing system, wherein the data processing system is configured to access in the data store:
(a) a first value that is based on the difference between:
(i) an estimate of how much longer a first agent of a call center will be serving a first call, wherein said estimate is provided by said first agent during said first call, and
(ii) the actual remaining service time for said first call;
(b) a second value that is based on the difference between:
(i) an estimate of how much longer a second agent of a call center will be serving a second call, wherein said estimate is provided by said second agent during said second call, and
(ii) the actual remaining service time for said second call;
(c) a measure of accuracy computed over a plurality of service time estimates provided by said first agent; and
(d) a measure of accuracy computed over a plurality of service time estimates provided by said second agent.

15. The system of claim 14 wherein the estimate provided by said first agent specifies a range.

16. The system of claim 14 further comprising:
(c) an indicium of said first agent; and
(d) an indicium of said second agent.

* * * * *